June 22, 1948.  R. E. BURRUS  2,443,720
DRIVE MEANS FOR VEHICLES
Filed Nov. 13, 1944  2 Sheets-Sheet 1

INVENTOR.
Robert E. Burrus,
BY Walter E. Schirmer
Atty.

June 22, 1948.   R. E. BURRUS   2,443,720
DRIVE MEANS FOR VEHICLES
Filed Nov. 13, 1944   2 Sheets-Sheet 2

INVENTOR.
Robert E. Burrus,
BY Walter E. Schirmer
Atty.

Patented June 22, 1948

2,443,720

UNITED STATES PATENT OFFICE 2,443,720

DRIVE MEANS FOR VEHICLES

Robert E. Burrus, Buchanan, Mich., assignor to Clark Equipment Company, Buchanan, Mich., a corporation of Michigan Application November 13, 1944, Serial No. 563,289

2 Claims. (Cl. 74—389)

This invention relates to drive means for vehicles, and more particularly is directed to a drive means for trucks and the like in which an auxiliary or booster engine is employed for adding to the torque of the main engine under conditions where the main engine torque is insufficient to maintain a desired speed under heavy load conditions.

The present invention is an improvement upon the driving connection between the auxiliary engine and the transmission of the vehicle over that disclosed in the patent to Donald D. Ormsby, No. 2,419,911.

One of the primary objects of the present invention is to provide means for interconnecting the lay shaft extending between the auxiliary engine and the countershaft of the main engine to the countershaft when the auxiliary engine is started and brought up to speed so that the torque of the auxiliary engine can be added to that of the main engine for driving the propeller shaft of the vehicle.

In the present invention there is provided an overrunning or one-way clutch construction interposed between the lay shaft and the gear train which connects this shaft to the countershaft of the vehicle transmission, which clutch operates when the auxiliary engine is brought up to speed for locking the lay shaft driven by the auxiliary engine into this gearing so that transmission of torque can be effected from the auxiliary engine into the countershaft of the transmission. In addition, the gear train is so designed and arranged as to provide for driving an auxiliary water pump for providing circulation of cooling water through the auxiliary engine at all times that the main engine is operating, thus providing for keeping this engine warm to facilitate its starting under the desired conditions when the auxiliary engine is required.

These and other objects and advantages of the present invention will appear more fully from the following detailed description which, taken in conjunction with the accompanying drawings, will disclose to those skilled in the art the particular construction and operation of a preferred embodiment of the invention.

Figure 1:
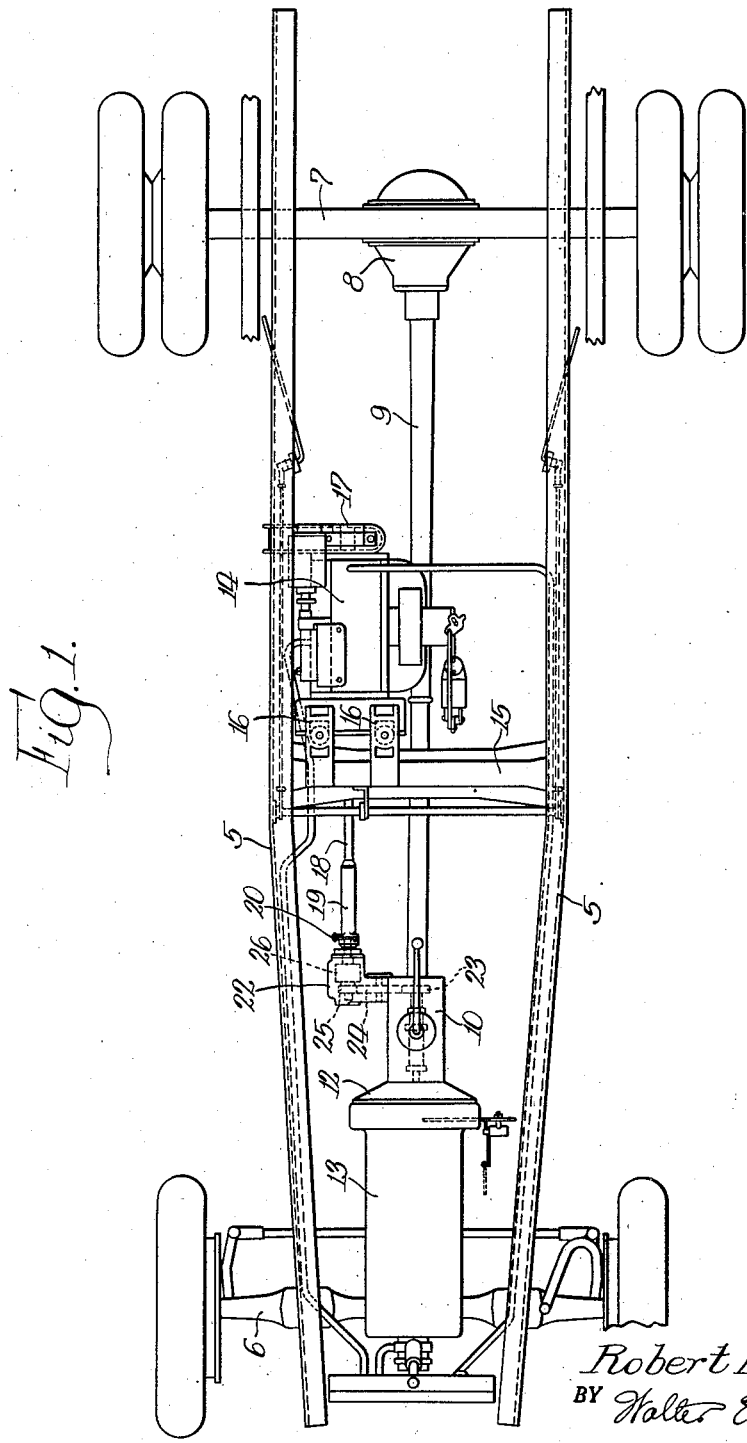
Figure 1 is a plan view of a vehicle chassis having an auxiliary engine embodied therein.

Referring in detail to the drawings, I have disclosed in Figure 1 a vehicle chassis having side rails 5, a front steering axle 6, and a rear driving axle 7.

The rear driving axle 7 is provided with a differential carrier 8 into which the propeller shaft 9 extends. This propeller shaft at its opposite end is connected to the transmission 10 of the vehicle, which transmission is connected in the usual manner through the clutch contained within clutch housing 12 to the main engine 13 of the vehicle.

There is provided an auxiliary engine 14 supported from the cross frame member 15 by means of the supporting brackets 16 at one end thereof, and supported at its opposite end by a trunnion mounting indicated generally at 17 secured to and depending from the side rail 5. The auxiliary engine 14 is reversed in position with respect to the main engine 13, and is laterally offset from the longitudinal center of the chassis. The output end of the auxiliary engine thereby faces forwardly and has connected thereto a lay shaft 18 having a splined connection to a driving sleeve 19 which, through the universal joint connection 20, extends into a housing 22 bolted or otherwise secured to the side of the transmission 10 in position normally corresponding to the power take-off opening of the transmission. The countershaft of the transmission is provided with a gear 23 which is in constant meshing engagement with an idler gear 24 carried in the housing 22. The idler gear 24 in turn is in meshing engagement with the pinion 25 journalled in the housing 22 and connected through the over-running clutch mechanism, indicated generally at 26, with the lay shaft extending to the auxiliary engine.

Figure 2:
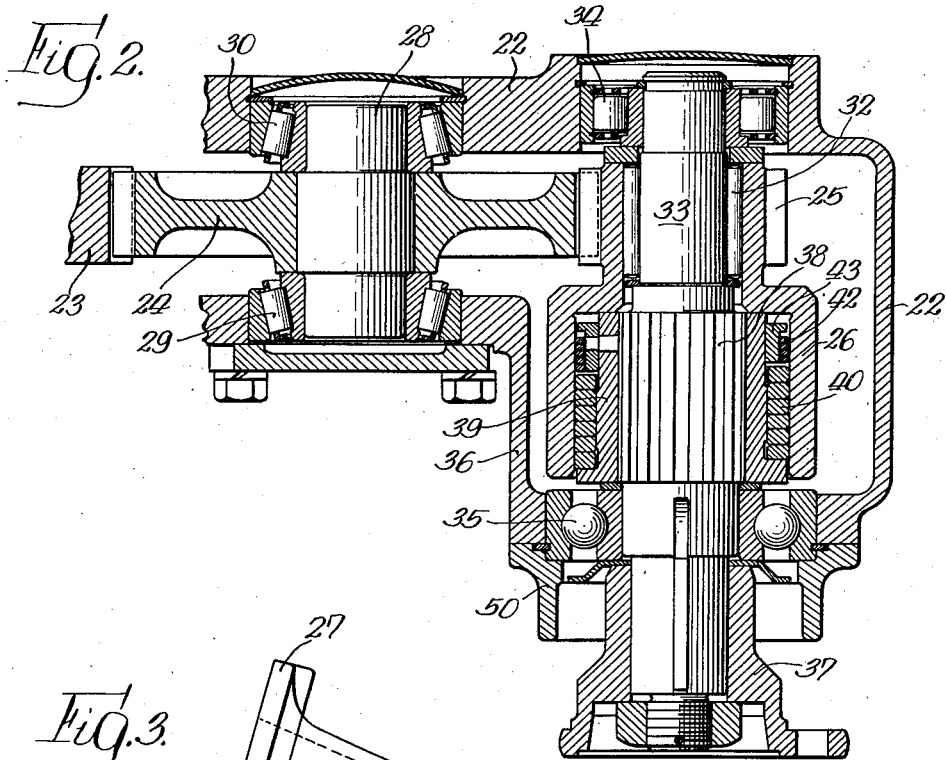
Figure 2 is a sectional view of the gear train and one-way clutch mechanism interconnecting the lay shaft of the auxiliary engine to the vehicle transmission.
Figure 3:
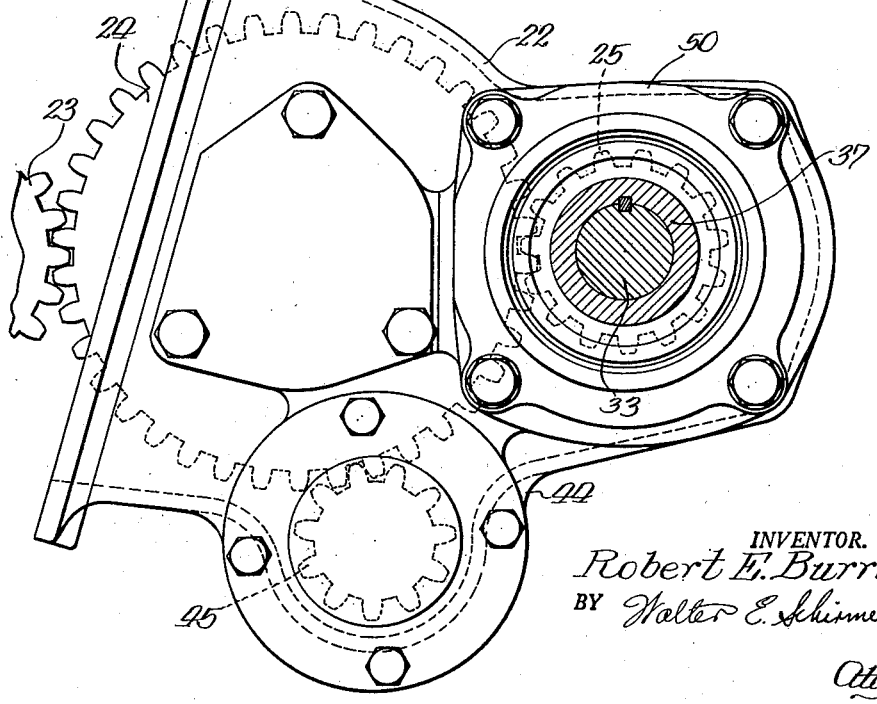
Figure 3 is an elevational view of the construction shown in Figure 2.

Considering now in detail the mechanism whereby the auxiliary shaft is connected into the transmission, this is shown in Figures 2 and 3. The housing 22 is provided with a flange portion 27 for bolting to the defining edge of the power takeoff opening of the transmission 10. As shown in Figure 3, the countershaft gear 23, which is driven from the main engine and which drives the transmission output shaft connected to the propeller shaft 9, is in meshing engagement with the idler gear 24, which idler gear, as shown in Figure 2, is mounted upon the shaft 28 carried in suitable bearings 29 and 30 in opposite side walls of the housing 22. The gear 24 in turn is in meshing engagement with a pinion gear 25 which has an enlarged cylindrical portion 26 forming the outer enclosing housing for the overrunning clutch mechanism. The pinion gear 25 is rotatably mounted by means of the needle rollers 32 upon a shaft 33, which shaft is journalled at its end by the roller bearing assembly 34 in the end wall of the housing 22. At its opposite end the shaft 33 is journalled by the ball bearing assembly 35 in an axial extension 36 of the housing 22, and projects outwardly to receive the companion flange 37 of the universal joint assembly 20. Intermediate its ends, the shaft 33 is splined as indicated at 38 to receive the sleeve 39, which sleeve carries on its external annular surface the helically coiled spring member 40 and the tickler spring assembly 42 supported on the bushing 43 pinned or otherwise secured to the sleeve 39.

The housing 22 has a downwardly offset portion 44 within which is mounted a gear 45 driven from the idler gear 44 and arranged to drive a water pump or the like for circulating cooling liquid from the main engine cooling system to the auxiliary engine. The details of this arrangement are not disclosed as they form no part of the present invention.

Referring now again to the gear train and drive from the auxiliary shaft 18 to the countershaft gear 23, it will be understood that when the auxiliary engine is stopped, the shaft 18 is idle since the countershaft drives the pinion 25 through the idler gear 24, but the rotation of this gear is in a direction such as to not energize the coil spring 40, and consequently the pinion gear 25 and its extension 26 merely rotate about the shaft 33 without imparting any torque to this shaft. However, when the auxiliary engine is started and is brought up to speed, the shaft 18 through the universal joint connection 20 drives the shaft 33 at a speed greater than the speed of rotation produced from the countershaft to the idler gear through the gear 25. As a result, the coil spring tickler 42 is energized to produce corresponding energization of the clutch spring 40, which causes this spring to tend to expand, thereby clutching the sleeve 39 to the extension 26 of the gear 25, providing a positive driving connection therebetween whereby the shaft 33 under these conditions drives the gear 25 to impart driving torque through the gear 24 to the countershaft gear 23 from the auxiliary engine. Whenever the speed of the auxiliary engine drops below a point at which the rotation of the shaft 33 exceeds the rotation of the gear 25, the clutch 40 becomes de-energized, thereby immediately stopping the transmission of torque from the shaft 18 into the countershaft of the transmission.

It will be apparent that the present construction is of simple design, and, also, that the entire assembly can be readily inspected for servicing and maintenance by removal of the closure cap 50 which is bolted to the extension 36 of the housing 22. Removal of this cap 50 allows removal of the bearing assembly 35, and in turn allows removal of the entire clutch assembly, including the sleeve 39 and the coil spring member. Thus, by disconnecting the universal joint connection 20 and removing the closure member 50, ready inspection or servicing of this unit is provided.

It is therefore believed apparent that I have provided a novel over-running clutch drive between the auxiliary shaft and the transmission gearing of the main engine to provide for automatically imparting the torque of the auxiliary engine to the propeller shaft of the vehicle whenever the speed of the auxiliary engine exceeds that at which the connecting gearing is being driven from the countershaft. Thus, whenever the auxiliary engine is energized and brought up to speed, it will supplement the torque of the main engine through its gear connection by means of the energization of the clutch 40. Whenever the auxiliary engine is stopped, it will be automatically disconnected from the gearing through the same clutch member becoming de-energized.

I do not intend to be limited to the exact details of the gearing arrangement and clutch assembly as herein disclosed, but only insofar as defined by the scope and spirit of the appended claims.

I claim:

1. The combination with a transmission including a countershaft, a gear housing secured to said transmission, and an idler gear journalled in said housing and meshing with a gear on said countershaft, of a lay shaft extending into and journalled at one end in said housing, a tubular pinion gear rotatably mounted on said lay shaft within said housing and having an enlarged portion radially spaced about said lay shaft, and one-way clutch means disposed radially between said lay shaft and said tubular pinion gear, cap means for said housing and arranged for removal to permit conjoint removal of said lay shaft, pinion gear and clutch means as a unit from said housing.

2. In combination, a housing including an idler gear, a lay shaft extending into said housing and journalled on axially spaced bearings therein, a tubular pinion gear rotatably journalled on said shaft and meshing with said idler gear, said pinion gear having an enlarged annular portion overlying and radially spaced from said lay shaft, a sleeve splined on said lay shaft within said enlarged overlying portion, and helically coiled spring means disposed radially between said sleeve and overlying portion operative to clutch said pinion gear to said shaft when said shaft tends to overrun said pinion gear, a bearing cap secured to said housing and removable to permit removal of one of said bearings, said lay shaft, sleeve and tubular pinion gear as a unit from said housing.

ROBERT E. BURRUS.

REFERENCES CITED

The following references are of record in the file of this patent:

UNITED STATES PATENTS

| Number | Name | Date |
|---|---|---|
| 727,143 | Jeffery | May 5, 1903 |
| 1,351,084 | Winther | Feb. 23, 1932 |
| 1,466,394 | Fornaca | Aug. 28, 1923 |
| 1,641,426 | Hardman | Sept. 6, 1927 |
| 1,846,766 | Starkey et al. | Feb. 23, 1932 |
| 1,952,415 | Brownlee | Mar. 27, 1934 |

FOREIGN PATENTS

| Number | Country | Date |
|---|---|---|
| 538,633 | Great Britain | Aug. 11, 1941 |